Dec. 3, 1935.  F. E. DAVIDSON  2,023,265
VALVE AND SPRING RETAINER THEREFOR
Filed May 14, 1934
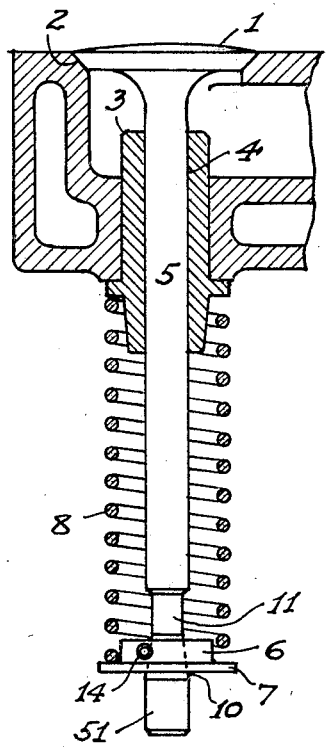
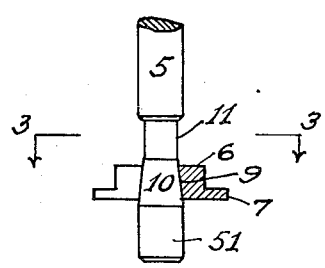
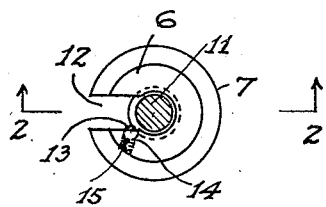
Witnesses:—  Inventor:—
William E. Simpson,  Frank E. Davidson, Patented Dec. 3, 1935

2,023,265

UNITED STATES PATENT OFFICE 2,023,265

VALVE AND SPRING RETAINER THEREFOR

Frank E. Davidson, Detroit, Mich.

Application May 14, 1934, Serial No. 725,433

5 Claims. (Cl. 251—144)

My invention relates to valves and spring retainers for the same, and its principal object is to provide a safe and reliable means for retaining the spring in position around the stem of the valve and for transferring the thrust of the spring thereto.

Another object of my invention is to provide a spring retainer which, instead of becoming loosened by the frequent impact due to operation at high speeds, will actually be secured more tightly in position thereby.

Another object of my invention is to provide a spring retainer which will remain in position upon the valve stem notwithstanding breakage of the valve spring.

A further object of my said invention is to provide a valve and spring retainer therefor which is simple in construction and economical to manufacture, and which may be easily and quickly removed and replaced under the difficult conditions incidental to the servicing of various types of motors.

With these and other objects in view, the invention consists in the improved construction, arrangement, and combination of parts which will be hereinafter fully described, reference being had to the accompanying drawing, which illustrates a preferred embodiment thereof, in which drawing—

Figure 1 is a fragmentary sectional view showing a valve and valve stem having my improved retaining means applied thereto.

Figure 2 is a section on line 2—2 of Figure 3 showing the valve retainer in position upon the stem, and Figure 3 is a section on line 3—3 of Figure 2.

Like characters designate corresponding parts throughout the several views.

1 is the valve head arranged in co-operative relation with the valve seat 2, while 3 is a valve guide of conventional construction having the vertical bore 4 in which the valve stem 5 reciprocates. 6 is the spring retainer, positioned adjacent the lower end of the valve stem and provided with the flange 7 upon which the valve spring 8 rests, in the manner well known in the art. Within the retainer 6 is a frusto-conical bore 9 having its larger diameter at the lower end and adapted to fit tightly upon the frusto-conical portion 10 upon the valve stem. Immediately above the portion 9 is a neck 11 of reduced diameter, and in the retainer 6 is a radial slot 12 extending from the bore to the outer periphery and having a width slightly larger than the diameter of the neck 11, the arrangement being such that when the slot 12 is brought into vertical coincidence with the neck 11 it may be slid over the same, after which the retainer may be moved downwardly so as to bring the bore 9 into proper engagement with the co-acting portion 10 in which position the parts will be thereafter firmly held by the pressure of the spring 8 against the flange 7.

In the case of motors equipped with valves of the overhead type it frequently happens that, when the valve spring breaks, the retainer becomes detached from the valve stem, as a result of which the valve is permitted to fall into the cylinder with very serious results. In order to prevent such an occurrence with valves constructed in accordance with my invention, I have provided the auxiliary retaining means illustrated in Figure 3, which consists essentially of a spherical or other friction member 13 which is slidably mounted in an opening 14 in the body of the retainer and backed by a helical spring 15, the member 13 and its co-acting spring being retained in position within the opening by mutilation of the inner and outer ends of the said opening or by any other suitable means.

The opening 14, as shown, is positioned at an angle to the inner face of the slot 12, and the member 13 is permitted, under the action of the spring 15, to project beyond the said face so that, in case the valve spring should break and the retainer 6 accidentally be brought into alignment with the reduced portion 11 upon the stem, the member 13 will be pressed against the stem, thereby choking the slot 12 and preventing the retainer from becoming detached.

In the example herein shown and illustrated, the upper portion of the valve stem 5 and the extreme lower portion 51 of the same are of uniform diameter throughout, and the frusto-conical portion 10 as well as the reduced portion 11 are of smaller diameter than the stem, by which construction the manufacturing operations are very much simplified, but I do not limit my invention to this particular form.

It will be observed from the foregoing that I have provided a safe and reliable construction for the purpose outlined and one which is economical to manufacture and easy to remove and replace, and while I have herein described and shown a preferred embodiment of my invention, it will be readily understood by those skilled in the art that the same may be modified in various ways to meet any particular or peculiar requirement, without departing from the spirit of my invention.

Having thus described my said invention, what I claim and desire to secure by Letters Patent of the United States is:

1. In a device of the character described, the combination, with a valve stem having a tapered portion whose cross-section increases in a direction away from the valve head, of a spring-retaining member having a bore adapted to fit upon the tapered portion of the stem and a slot extending from said bore to the outer periphery said slot being narrower than the diameter of the bore of said member and wider than the portion of the stem adjacent the smallest part of said tapered portion, whereby said member may be slid laterally over the valve stem and then moved longitudinally into engagement with the tapered portion thereof, and means provided upon and as part of said retaining member and adapted to prevent accidental removal of the retaining member from the stem.

2. In a device of the character described, the combination, with a valve stem having a tapered portion whose cross-section increases in a direction away from the valve head, of a spring-retaining member having a bore adapted to fit upon the tapered portion of the stem and a slot extending from said bore to the outer periphery, said slot being narrower than the diameter of the bore of said member and wider than the portion of the stem adjacent the smallest part of said tapered portion, whereby said member may be slid laterally over the valve stem and then moved longitudinally into engagement with the tapered portion thereof, and means adapted to project into the slot and prevent accidental removal of the retaining member from the stem.

3. In a device of the character described, the combination, with a valve stem having a tapered portion whose cross-section increases in a direction away from the valve head, of a spring-retaining member having a bore adapted to fit upon the tapered portion of the stem and a slot extending from said bore to the outer periphery, said slot being narrower than the diameter of the bore of said member and wider than the portion of the stem adjacent the smallest part of said tapered portion, whereby said member may be slid laterally over the valve stem and then moved longitudinally into engagement with the tapered portion thereof, and resilient means acting independently of the valve spring and adapted to prevent accidental removal of the retaining member from the stem.

4. In a device of the character described, the combination, with a valve stem having a tapered portion whose cross-section increases in a direction away from the valve head, of a spring-retaining member having a bore adapted to fit upon the tapered portion of the stem and a slot extending from said bore to the outer periphery, said slot being narrower than the diameter of the bore of said member and wider than the portion of the stem adjacent the smallest part of said tapered portion, whereby said member may be slid laterally over the valve stem and then moved longitudinally into engagement with the tapered portion thereof, and resilient means adapted to project into the slot and prevent accidental removal of the retaining member from the stem.

5. In a device of the character described, the combination, with a valve stem having a tapered portion whose cross-section increases in a direction away from the valve head, of a spring-retaining member having a bore adapted to fit upon the tapered portion of the stem and a slot extending from said bore to the outer periphery, said slot being narrower than the diameter of the bore of said member and wider than the portion of the stem adjacent the smallest part of said tapered portion, whereby said member may be slid laterally over the valve stem and then moved longitudinally into engagement with the tapered portion thereof, said retainer having an opening extending into said slot, and a spring-actuated member within said opening adapted to project into said slot and prevent accidental removal of the retaining member from the stem.

FRANK E. DAVIDSON.